Patented Nov. 21, 1939

2,180,636

UNITED STATES PATENT OFFICE 2,180,636

AMINO ACIDS PRODUCT AND METHOD OF MANUFACTURE

Kenneth S. Kemmerer, Evansville, Ind., assignor to Mead Johnson & Company, Evansville, Ind., a corporation of Indiana No Drawing. Application July 6, 1937, Serial No. 152,236

6 Claims. (Cl. 260—529)

This invention relates to a nutrient product which contains all of the amino acids resulting from the hydrolysis of highly purified proteid material, and characterized by the preservation therein of all the amino acids, except tryptophane, naturally occurring in the chosen proteid material.

The main object of the invention is to produce a product of the character described, which is suitable for oral, rectal, and intravenous administration, for furnishing the body with the elements required for body protein. The product is adapted for intravenous or other administration in cases where the blood serum protein has decreased below normal, in which it is frequently impossible to absorb or digest protein by mouth.

The formation of amino acids from proteins by hydrolysis with acids, alkalis or enzymes is well known, the objects of prior art methods being the production of sodium compounds of amino acids for food flavoring purposes, or the separation of one amino acid from others. The product of my invention, intended for entirely different and new uses, is highly purified and has a minimum of taste and flavor; it contains the amino acids, as distinguished from the salts of amino acids, resulting from the hydrolysis of highly purified proteid material; is practically devoid of ash constituents and free from sodium chloride; and is free of the hydrolytic and neutralizing agents employed in its preparation.

The resultant product is a dry, nearly white, fine and fluffy powder composed of all the amino acids resulting from hydrolysis of pure protein material, the product having a very low ash content, not less than 12 per cent total nitrogen and not less than 9.2 per cent amino nitrogen.

Preferably I employ casein as the protein to be treated. The casein may be precipitated by any mineral or organic acid. The acid precipitated casein is purified by washing repeatedly with acidified water to effect removal of the mineral salts. Hydrochloric acid or acetic acid may be used.

The purified casein is refluxed for approximately sixteen hours with 33%, by volume, sulphuric acid. Any mineral acid, as hydrochloric, sulfuric or phosphoric acid, etc., may be used but sulfuric acid is preferred due to its ease of removal. The time may be varied if the pressure is also varied. Thus a shorter time of hydrolysis is feasible if the pressure is increased. Likewise the concentration of the acid may vary if the time of refluxing is shortened or lengthened correspondingly. There is no definite set of conditions for the hydrolytic process. However, the 33% sulfuric acid concentration gives the best results in that there is a minimum of decomposition products formed.

The hydrolyzed material is then heated to a minimum of 180° F. A maximum of 220° F. may be used.

The heated material is then diluted with approximately three volumes of water heated to 180° F. or more, and the chemically equivalent amount of barium hydroxide necessary to neutralize the hydrolytic agent. The quantity of water may be varied.

Preferably at the time the barium hydroxide is added, I add activated carbon for decolorizing the material. "Norit", the trade name of an activated carbon, is preferred, in the proportion of one-fifth by weight of the original protein.

The precipitated barium sulphate and carbon are then filtered.

The resultant straw colored solution is next concentrated under vacuum to incipient crystallization. Concentration under vacuum is essential as decomposition results if the temperature becomes too high.

Additional barium hydroxide is added carefully until complete removal of the hydrolytic agent (sulphuric acid) is indicated by tests. The object is not to neutralize the preparation to a definite pH, but to effect exact removal of the hydrolytic agent and freedom from alkali salts.

Next an excess of hydrogen sulphide is added to precipitate the heavy metals such as copper, lead, tin, zinc, iron, nickel, arsenic, mercury, etc.

Finally the preparation is filtered, concentrated and dried, either by drum or spray drying.

The use of sulphuric acid as the hydrolyzing agent and of barium hydroxide as the neutralizing agent is advantageous because of the formation of the insoluble salt, which can be entirely removed. Thus, there remains no mineral acid or neutralizing agent (barium hydroxide), both being exactly removed by filtration as the insoluble salt, barium sulfate. The final product has not less than 12 per cent total nitrogen and not less than 9.2 per cent amino nitrogen.

The product is characterized by its freedom from objectionable contaminants, its white color and fine, fluffy appearance, practical freedom from ash constituents, salt compounds and metals, by its minimum taste and flavor, and its adaptability to the parenteral administration of amino acids.

I claim:

1. Process of preparing a nutrient material suitable for oral, rectal, and intravenous administration, containing all of the amino acids resulting from the hydrolysis of highly purified proteid material, which comprises washing acid-precipitated protein with acidified water until free from mineral salts, refluxing the washed protein with a mineral acid, heating the hydrolyzed material, diluting the material with water, adding barium hydroxide in a quantity sufficient to neutralize the hydrolytic agent, adding activated carbon, filtering the product, concentrating the same under vacuum, carefully adding additional barium hydroxide until complete removal of the hydrolytic agent and freedom from mineral acid is effected, adding hydrogen sulphide to precipitate heavy metals, filtering, concentrating and drying the product.

2. Process of preparing a nutrient material suitable for oral, rectal, and intravenous administration, containing all of the amino acids resulting from the hydrolysis of highly purified proteid material, which comprises washing acid-precipitated protein with acidified water until free from mineral salts, refluxing the washed protein with a mineral acid, heating the hydrolyzed material to a minimum of 180° F., diluting the material with approximately three volumes of hot water, adding barium hydroxide in a quantity sufficient to neutralize the hydrolytic agent, adding activated carbon, filtering the product, concentrating the same under vacuum to incipient crystallization, carefully adding additional barium hydroxide until complete removal of the hydrolytic agent and freedom from mineral acid is effected, adding an excess of hydrogen sulphide to precipitate heavy metals, filtering, concentrating and drying the product.

3. Process of preparing a nutrient material suitable for oral, rectal, and intravenous administration, containing all of the amino acids resulting from the hydrolysis of highly purified proteid material, which comprises washing acid-precipitated protein with acidified water until free from mineral salts, refluxing the washed protein with sulphuric acid, heating the hydrolyzed material, diluting the material with water, adding barium hydroxide in a quantity sufficient to neutralize the sulphuric acid, adding activated carbon, filtering the product, concentrating the same under vacuum, carefully adding additional barium hydroxide until complete removal of the sulphuric acid and freedom from mineral acid is effected, adding hydrogen sulphide to precipitate heavy metals, filtering, concentrating and drying the product.

4. Process of preparing a nutrient material suitable for oral, rectal, and intravenous administration, containing all of the amino acids resulting from the hydrolysis of highly purified proteid material, which comprises washing acid-precipitated protein with acidified water until free from mineral salts, refluxing the washed protein with 33 per cent by volume of sulphuric acid, heating the hydrolyzed material to a minimum of 180° F., diluting the material with approximately three volumes of hot water, adding barium hydroxide in a quantity sufficient to neutralize the sulphuric acid, adding activated carbon, filtering the product, concentrating the same under vacuum to incipient crystallization, carefully adding additional barium hydroxide until complete removal of the sulphuric acid and freedom from mineral acid is effected, adding an excess of hydrogen sulphide to precipitate heavy metals, filtering, concentrating and drying the product.

5. A nutrient material suitable for oral, rectal, and intraveneous administration, containing all of the amino acids resulting from the hydrolysis of highly purified proteid material, and characterized by the preservation in the hydrolyzed material of all the amino acids, except tryptophane, naturally occurring in the chosen proteid material, and by practical freedom from ash constituents and sodium compounds.

6. A nutrient material suitable for oral, rectal, and intravenous administration, containing all of the amino acids resulting from the hydrolysis of highly purified proteid material, and characterized by the preservation in the hydrolyzed material of all the amino acids, except tryptophane, naturally occurring in the chosen proteid material, and by practical freedom from ash constituents and sodium compounds, said product being further characterized by a minimum of taste and flavor and having not less than 12 per cent total nitrogen and not less than 9.2 per cent amino nitrogen.

KENNETH S. KEMMERER.